United States Patent
Delbaere et al.

(10) Patent No.: US 11,573,099 B2
(45) Date of Patent: Feb. 7, 2023

(54) MODULE FOR DETECTING A ROTATING HANDLE OF A MOTOR VEHICLE

(71) Applicant: MOVING MAGNET TECHNOLOGIES, Besançon (FR)

(72) Inventors: Michaël Delbaere, Avanne-Aveney (FR); Yannick Ronnat, Vorges les Pins (FR)

(73) Assignee: Moving Magnet Technologies, Besancon (FR)

( * ) Notice: Subject to any disclaimer, the term of this patent is extended or adjusted under 35 U.S.C. 154(b) by 309 days.

(21) Appl. No.: 16/648,311

(22) PCT Filed: Sep. 6, 2018

(86) PCT No.: PCT/HR2018/052179
§ 371 (c)(1),
(2) Date: Aug. 6, 2020

(87) PCT Pub. No.: WO2019/058044
PCT Pub. Date: Mar. 28, 2019

(65) Prior Publication Data
US 2020/0393270 A1 Dec. 17, 2020

(30) Foreign Application Priority Data
Sep. 25, 2017 (FR) ...................................... 1758824

(51) Int. Cl.
*G01D 5/14* (2006.01)
*G01B 7/30* (2006.01)
(52) U.S. Cl.
CPC ............... *G01D 5/145* (2013.01); *G01B 7/30* (2013.01)
(58) Field of Classification Search
CPC .................................. G01D 5/145; G01B 7/30
See application file for complete search history.

(56) References Cited

U.S. PATENT DOCUMENTS

| 6,879,150 B2 | 5/2005 | Aoki et al. | |
| 7,675,283 B2 * | 3/2010 | Hino | B62K 23/04 324/207.2 |

(Continued)

FOREIGN PATENT DOCUMENTS

| EP | 2610585 A1 | 7/2013 |
| EP | 2716891 B1 | 1/2016 |

(Continued)

OTHER PUBLICATIONS

International Search Report in corresponding PCT Application No. PCT/FR2018/052179 dated Nov. 30, 2018.

(Continued)

*Primary Examiner* — Reena Aurora
(74) *Attorney, Agent, or Firm* — Harness Dickey & Pierce, PLC (57) ABSTRACT

A module for detecting a rotating handle intended to be attached on a tube of a handlebar of a vehicle next to the handle includes a cylindrical magnet, a probe for detecting the magnetic field produced by the magnet, a support for the probe, a printed circuit board whereon the probe is secured, a support for the magnet and a flange used as a housing for the module. The magneto-sensitive probe detects rotation of the magnetic field emitted by the magnet and is secured to the handlebar, with the magnet and magnet holder being secured to the handle. The magnet and magnet holder form a cavity so that the inner radial surface of the magnet is positioned outside and opposite the magneto-sensitive probe. The magnet has a continuously variable magnetization direction so that the total rotation of the angle of the magnetic field generated by the magnet at the measuring point during the mechanical rotation of the handle is greater than 180°.

14 Claims, 8 Drawing Sheets

(56) References Cited

U.S. PATENT DOCUMENTS

| | | |
|---|---|---|
| 9,714,849 B2 | 7/2017 | Biwersi et al. |
| 10,864,962 B2 * | 12/2020 | Pankratz ................. B62J 45/41 |
| 2007/0090827 A1 | 4/2007 | Jarrard |
| 2010/0231205 A1 | 9/2010 | Jerance et al. |
| 2012/0242331 A1 | 9/2012 | Dengler et al. |

FOREIGN PATENT DOCUMENTS

| | | |
|---|---|---|
| EP | 3059552 A1 | 8/2016 |
| FR | 2951265 A1 | 4/2011 |
| JP | H0350905 A1 | 3/1991 |

OTHER PUBLICATIONS

Arbenz, L. et al., "Characterization of Permanent Magnet Magnetization," IEEE Transactions on Magnetics, vol. 53, No. 11, Nov. 2017.

* cited by examiner

MODULE FOR DETECTING A ROTATING HANDLE OF A MOTOR VEHICLE

CROSS-REFERENCE TO RELATED APPLICATIONS

This application is a National Phase Entry of International Patent Application No. PCT/FR2018/052179, filed on Sep. 6, 2018, which claims priority to French Patent Application No. 17/58824, filed on Sep. 25, 2017, both of which are incorporated by reference herein.

TECHNICAL FIELD

The invention refers to motor vehicles with a handle that can be rotated angularly to manage, for example, the acceleration (acceleration/deceleration) and the vehicle speed. In the case of internal combustion engine motorcycles, these handles, often referred to as "gas handles", may have an angular position sensor when they do not include cables mechanically connecting the handle to the intake gas flow management device (ride-by-wire). The present invention more particularly relates to a module for detecting the angular position of the handle that can be used in the above-mentioned field on any vehicle powered by an internal combustion engine or an electric motor.

BACKGROUND

Document JPH0350905, which has such a position sensor integrated inside a handle and located at the end of the handle, is already known from the previous art. The sensing element is a potentiometer. This embodiment has several disadvantages: a potentiometer uses friction elements and the positioning at the end of the handlebars is not practical for the installation of the sensor, with the need to extend the power and signal feedback wires.

Document EP2610585 presents a great improvement of the principle by a more compact integration, upstream of the handlebar and using a Hall effect probe detecting the magnetic field emitted by a radially magnetized ring sector. This document also proposes the integration of a position return spring within the volume defined by the rotating magnet. This embodiment nevertheless has defects: the volume of the magnet used is large, the Hall effect probe, although positioned inside the magnet, is sensitive to an external disturbing magnetic field due to the absence of an integrated shielding structure.

Document EP2716891 is also known, which has a similar configuration to the previous document but with an integration of the return spring in a different position and a ferromagnetic cylinder head bearing a magnet the magnetization direction of which is not specified, which enables a partial magnetic shielding to reduce the influence of a possible external magnetic field on the Hall effect probe. This embodiment suffers from poor axial compactness and a certain sensitivity to an external magnetic field, despite the cylinder head.

Finally, the document U.S. Pat. No. 6,879,150 which presents several configurations of magnetic position sensors that can be integrated in an accelerator handle, and using field strength detection from a bipolar polarized magnet, is known. In addition to the fact that only the amplitude of the field is measured, which makes it directly sensitive to any external magnetic disturbance, the rotation of the magnetic field at the measuring point takes only 2 discrete values, 90° and −90°, due to the presence of iron and in any case always less than 180° and can never exceed this value.

SUMMARY

The present invention aims to overcome the disadvantages of prior art solutions by proposing a position detection module using an inner magnetic field detection probe associated with a rotating magnet, axially compact and providing a better insensitivity to external magnetic fields. For this purpose, the present invention proposes an angular position detection module intended in particular for an accelerator handle using a magnet having a magnetization direction variable according to the circumferential direction of detection so as to achieve a large rotation of the angle of the magnetic field along the mechanical travel at the level of a magneto-sensitive probe measuring the field direction, and not the amplitude of the field, and over an angular amplitude greater than that allowed using a magnet with radial magnetization. Since the magneto-sensitive probe calculates the angle of the magnetic field, the increase in the total rotation of the angle of this field on the angular excursion reduces the influence of an external magnetic field.

The invention also aims to enable the integration of different layers of magnetic shielding, further reinforcing this insensitivity to external magnetic fields. More specifically, the invention proposes a detection module for a rotating handlebar intended to be attached on the tube of a handlebar of a vehicle next to said handlebar and comprising a cylindrical magnet, a probe for detecting the probe for detecting the magnetic field produced by said magnet, a support for said probe, a printed circuit board whereon said probe is attached, a support for said magnet and a flange being used as a housing for said module, with said magneto-sensitive probe detecting the rotation of the magnetic field emitted by said magnet and being secured to said handlebar, with said magnet and magnet holder being secured to said handle, said magnet and magnet holder forming a cavity so that the inner radial surface of the magnet is positioned outside and opposite said magneto-sensitive probe, characterized in that said magnet has a continuously variable magnetization direction so that the total rotation of the angle of the magnetic field angle generated by said magnet at the measurement point during the mechanical rotation of the handle is greater than 180°.

Preferably, said magnet has an angular width, considered from the center of the handlebar, substantially equal to the angular travel of said handlebar, but this width can also be considered from the center of the handlebar, substantially equal to 360°. To maximize the effect aimed at by the invention, the rotation of the magnetic field angle can be substantially equal to 3 times said complete mechanical rotation of said handle.

According to another aspect of the invention, but always with the aim of reducing the sensitivity of the detection module to external magnetic fields, the invention relates to a detection module of a rotating handle intended to be attached on the tube of a handlebar of a vehicle next to said handlebar and comprising a cylindrical magnet, a probe for detecting the magnetic field produced by said magnet, a support for said probe, a printed circuit board whereon said probe is secured, a support for said magnet and a flange being used as a housing for said module, said magneto-sensitive probe detecting the rotation of the magnetic field emitted by said magnet and being secured to said handlebar, with said magnet and magnet holder being secured to said handle, said magnet and magnet holder forming a cavity so that the inner radial surface of the magnet is positioned externally and opposite said magneto-sensitive probe, characterized in that it comprises an elastic return spring positioned radially and externally to said magnet holder.

In this case, said spring can advantageously be made of a magnetic material or a spring made by magnetic cooperation of a return magnet with said magnet. In any case, said magnet holder can support a magnetic shielding on its periphery and also a magnetic shielding can be positioned inside said housing and be secured to said housing. This shielding may have an angular width substantially equal to that of the magnet or an angular width substantially equal to 360°. In order to maximize the magnetic shielding effect, the flange can be made of a magnetic material.

The invention will find a preferred application for a handle to be mounted on the tube of a vehicle handlebar comprising a permanent magnet integral with a first portion of said handle and a magneto-sensitive sensor secured to a second portion of said handle, with said portions being rotatable with respect to each other, characterized in that said magnet has a semi-cylindrical shape, with the detection module comprising a printed circuit whereon said probe is secured, with a support for said magnet and a flange being used as a housing for said module, with said magneto-sensitive probe detecting the rotation of the magnetic field emitted by said magnet and being secured to said handlebar, with said magnet and magnet holder being secured to said handle, with said magnet and magnet holder forming a cavity so that the inner radial surface of the magnet is positioned outside and opposite said magneto-sensitive probe, with said magnet having a continuously variable magnetization direction so that the total rotation of the angle of the magnetic field, generated by said magnet at the measurement point during the mechanical rotation of the handle, is greater than 180°.

BRIEF DESCRIPTION OF THE FIGURES

Other characteristics and advantages of the invention will emerge from the following description of examples of detailed embodiments, with reference to the appended drawings, in which.

DETAILED DESCRIPTION

Figures 1, 2A, 2B:
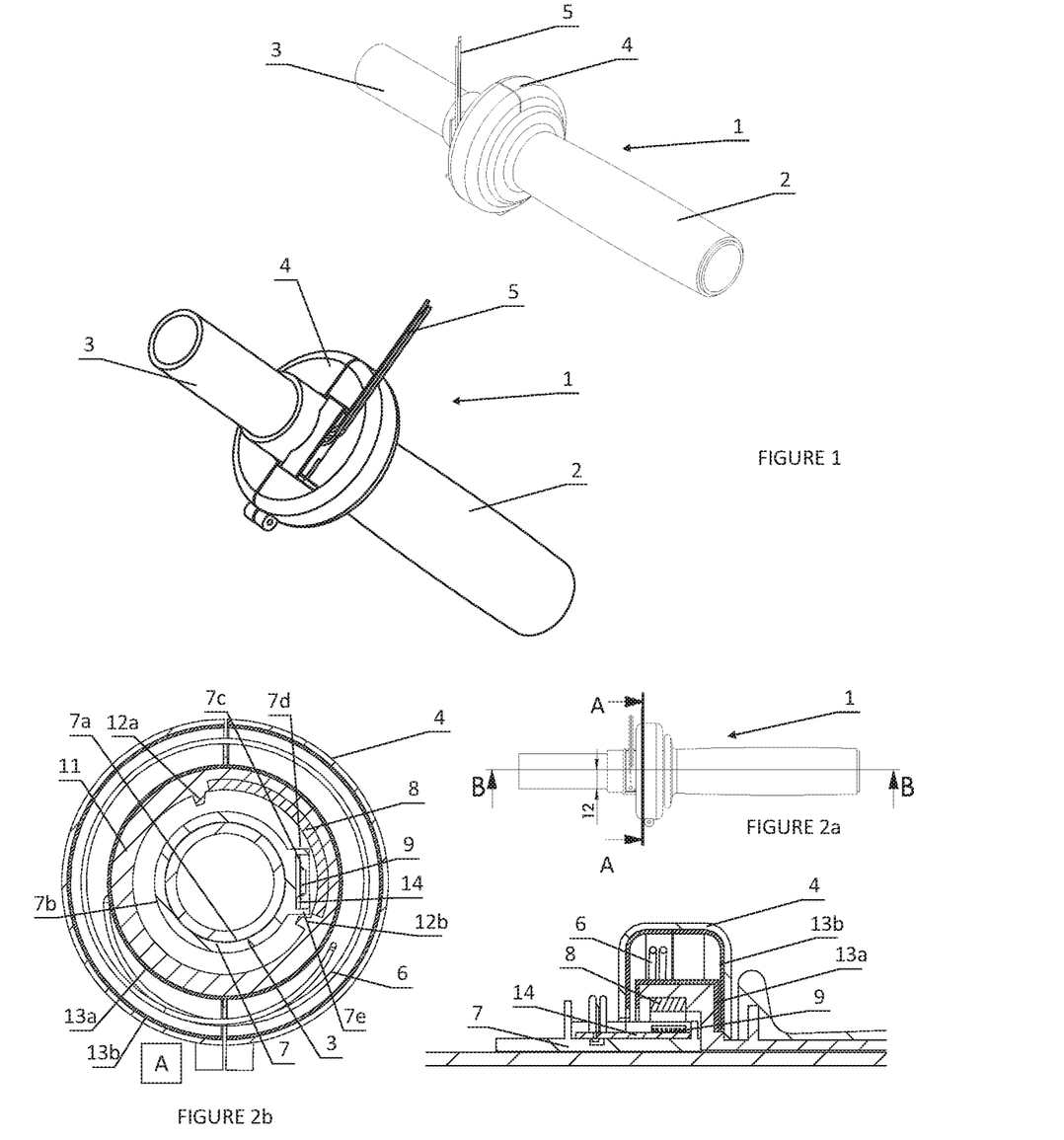
FIG. 1 shows two isolated views of a motor vehicle handlebar that can accommodate a detection module according to the invention.
FIGS. 2a, 2b and 2c, respectively show a front view, a view (A) along a cross-sectional plane and a view (B) along a longitudinal section plane, of a handlebar as shown in FIG. 1.

FIG. 1 shows two isolated views of the same exemplary handlebar 1 of a motor vehicle capable of receiving a detection module according to the invention. This handlebar 1 consists of a handlebar 2 rotating relative to the handlebar tube 3 and used to control the acceleration of the vehicle, as well as a flange 4, acting as a housing, containing a detection module as described by the present invention, and a bundle 5 of electrical cables intended to supply said detection module and to output the information signal given by said detection module. The shape, position and orientation of the elements shown are for information only and may vary, depending on the vehicle.

Figure 2C:
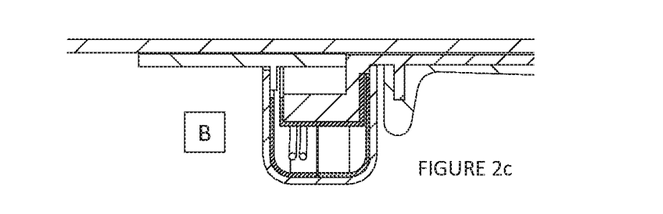

FIG. 2a shows a side view of a handlebar that is intersected by two planes A and B, with the view of these planes being given in FIGS. 2b and 2c respectively. These figures make it possible to appreciate the various main elements and their relative positioning that make up an angular position detection module as described by the present invention. These elements are positioned inside the flange 4.

Figure 15:
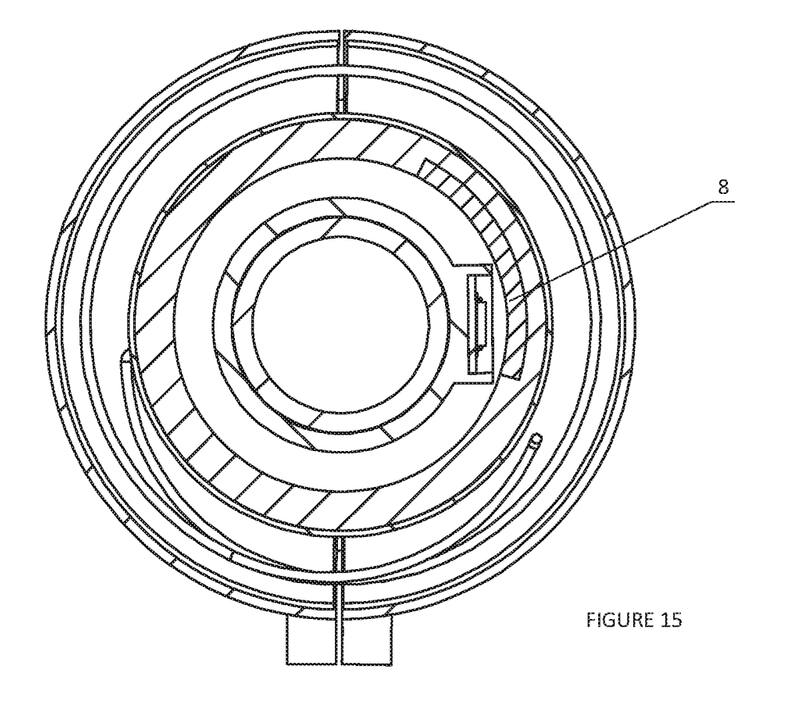
FIG. 15 shows a cross-sectional view of an alternative embodiment wherein the magnet has a different angular width than the one shown in the other embodiments.

These elements are, from the innermost to the outermost: the handlebar 1 which carries a probe holder 7, with said holder 7 carrying a printed circuit 14 whereon a probe 9 for detecting the orientation of a magnetic field emitted by the permanent magnet 8 rests. The magnetization of this magnet is important and described below. This magnet 8 is here provided as an angular sector the angular width of which is here close to 120° without this width being restrictive as described for example in FIG. 15 where the magnet has an angular width of 80°.

The magnet 8 has a tile shape with a continuously variable magnetization direction so that the total rotation of the angle of the magnetic field, generated by said magnet 8 at the measurement point during the mechanical rotation of the handle 2, is greater than 180°. This solution makes it possible to increase the resolution of the detection module by transforming a mechanical rotation of small amplitude, for example 80° to a magnetic rotation of larger amplitude, for example 180° or 270°.

The continuously variable magnetization is performed in a known manner by a magnetization head. The rotation of the magnetization direction in a magnet can be determined by the skilled person, from a polarized magnet, by applying the lessons of the technique which are for example described in the IEEE scientific publication "Characterization of permanent magnet magnetization" by Dr. Laure Arbenz et al.

Advantageously, this angular width corresponds approximately to the travel of the handle 2. The magnet 8 is carried by a magnet holder 11 which can be made of a non-magnetic or magnetic material and which has two stops 12a, 12b limiting the angular travel of the handle 2 coming into contact with the probe holder 7 at either end of travel. The presence of these stops is not essential to the invention and they may also be located on another part of the handle or handlebar. Similarly, the probe holder 7 is not necessarily the element for cooperating with the stops 12a, 12b. The inner radial surface of the magnet 8 is facing the probe 9 during the rotation of the handle 2 relative to the tube 3.

In the exemplary embodiment described in reference to FIG. 2b, the handle integrating the rotary position detection module consists of a cylindrical support 7 made of a plastic material with an inner surface 7a matching the outer section of the handlebar tube, to allow sliding mounting on the handlebar tube 3 and subsequent attachment by a known system, such as a clamp. This cylindrical support 7 surrounds the handlebar tube 3 in such a way that it cannot rotate relative thereto. This support 7 has a cylindrical outer surface 7b except for an area defining a housing 7c the bottom of which is perpendicular to the radial direction. This housing 7c is open in the opposite direction of the handlebar tube 3 in which the printed circuit board 14 on which the Hall probe 9 is mounted. The section of the housing 7c corresponds to the section of the printed circuit board 14 and its depth is a function of the height of the printed circuit board equipped with the Hall probe, in order to come flush with the inner surface of the magnet 8. The sides 7d, 7e of the housing 7c abut against the shoulders 12a; 12b extending radially to the surface of the sleeve 11 on which the semi-tubular magnet 8 is mounted. This mechanical stop design is given as an example.

The flanks 7d, 7e thus interact with these shoulders 12a; 12b to delimit the rotary travel to a value between 75° and 85°, generally 80°. A return spring 6 returns the rotating part of the handle to a rest position in a known manner. In a preferred alternative embodiment, the probe 9 has its largest surface area facing the inner radial surface of the magnet 8. However, this orientation is not restrictive and may be different as explained in FIGS. 12a and 12b.

In this first exemplary embodiment, the magnet holder 11 has a first magnetic shield 13a on its outer circumference in the form of a thin ferromagnetic sheet wound or stamped on the magnet holder 11 which is used to channel any magnetic field outside the detection module. This first shielding 13a gives the detection module a certain immunity to external fields but the performance can be improved by using a second magnetic shielding 13b worn inside the flange 4. This second shielding 13b is also in the form of a thin rolled ferromagnetic sheet. In order to improve the efficiency of these shieldings 13a, 13b, they may have axial and radial extensions to surround the magnet 8 but leave an inner opening to leave the magnet facing the probe 9.

In the space radially separating the shields 13a and 13b, a mechanical spring 6 is advantageously positioned, which enables the handle 2 to return to its position once it has been released by the user. The number of turns of this mechanical spring 6 is not exhaustive and is shown for illustrative purposes only. The whole of the detection module thus configured confers a great axial compactness, relative to the extended shape of the handle 2, and makes it possible to maintain a great availability for the positioning of the handle 2 on one end and for the addition of a control button module on the other end or to leave a great freedom to the designer to cover the detection module, while making it possible to confer a shielding complying with the external magnetic disturbances.

This insensitivity to magnetic disturbances is improved by the main characteristic of the invention which is to achieve a rotating magnetization direction in the magnet 8 in order to generate a magnetic field the rotation of which, at the measurement point in the probe 9, is significant. In the case of a magnet with a radial magnetization direction, the magnetic field at the measuring point—in the probe 9—undergoes a rotation substantially similar to the rotation of the handle except for the edge effects. On the contrary, by rotating the direction of the magnetization in the magnet 8, it could be noticed that the magnetic field at the point of the probe 9 rotates much more than the rotation of the handle. Thus, by measuring this magnetic rotation angle when rotating the handle, the probe 9 detects a higher rotation than the handle. Scaling to deduce the effective rotation of the handle cleverly reduces the influence of any external magnetic field. If these devices were not sufficient to absorb the entire magnetic disturbance, it is then possible to consider using a differential measurement probe which then makes it possible to cancel the common mode of the residual disturbing magnetic field measured at the 2 measurement points of the probe.

Figure 3A:
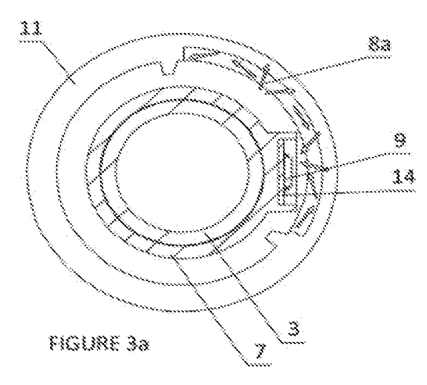
FIGS. 3a and 3b show two cross-sectional views of a detection module according to two different embodiments of a variable direction magnetization.
Figure 3B:
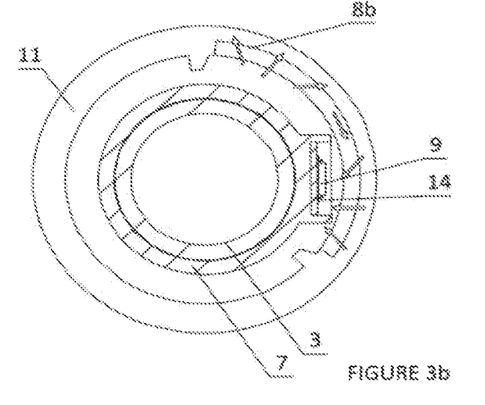

In the examples in FIGS. 3a and 3b, where some of the elements described above are found, the magnetization directions of the magnets 8a and 8b are shown at each position in the magnet using the solid arrows and are respectively close to 400° and 240°, values that are given as examples. It should be noted that in its central part, the magnet does not necessarily have a tangential magnetization vector as shown here. The rotation of the magnetization direction is continuous along the magnet in the circumference and identical according to the height of the cylinder formed, i.e. parallel to the axis of the handlebar 1. The choice of the rotation value of the magnetization direction is primarily dictated by the level of immunity to the desired external magnetic fields and the non-linearity of the desired signal. A high rotation of the magnetization direction (typically greater than 360°) implies good insensitivity to external magnetic disturbances. According to the invention, the total rotation of the magnetization direction will be such that the total rotation of the angle of the magnetic field generated by said magnet 8 at the measurement point is greater than 180°. In some cases, it will advantageously be more than three times the actual rotation of the handle (for example, more than 240° for a handle travel of 80°).

Figure 4:
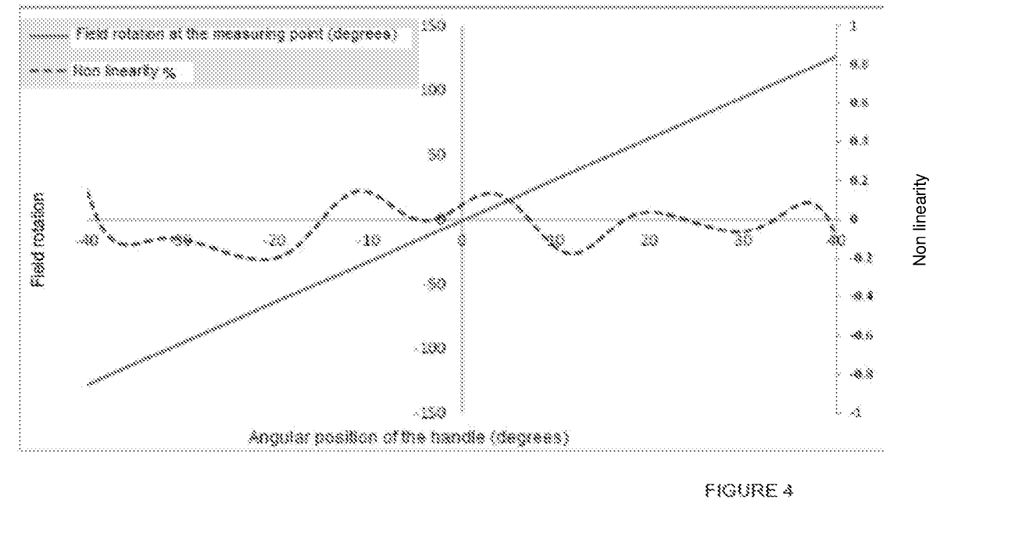
FIG. 4 shows a graph of the evolution of the field rotation and non-linearity along the mechanical travel, typically obtained with a detection module according to the invention.

In the example in FIG. 4, the rotation changes of the magnetic field at the measuring point are plotted for a total field rotation of 220° and the non-linearity of the signal over a mechanical handle rotation angle of 80° (+/−40° around a central position). This example shows that, for a given complete rotation, the magnetic field at the measuring point rotates almost three times as much. This is an advantage against external magnetic fields because it minimizes their influence on the non-linearity of the signal. Indeed, using a rule of three, these 220° of rotation actually detected are reduced to a travel of 80°. Any disruptions will also be scaled and thus reduced.

Figure 5:
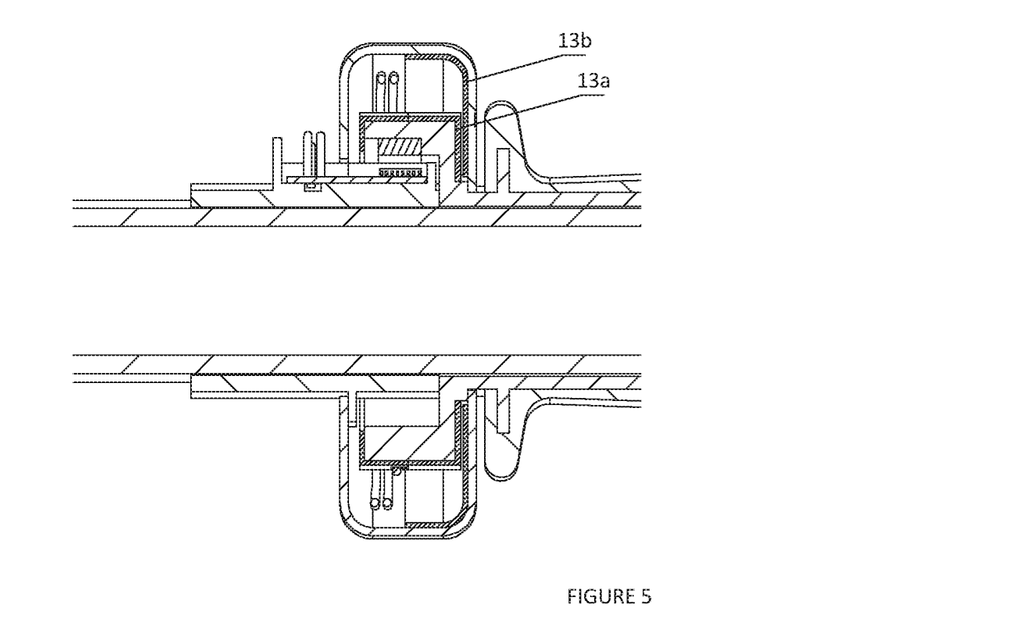
FIGS. 5, 6 and 7 show cross-sectional and longitudinal views of different embodiments of magnetic shieldings integrated in a detection module according to the invention.
Figure 6:
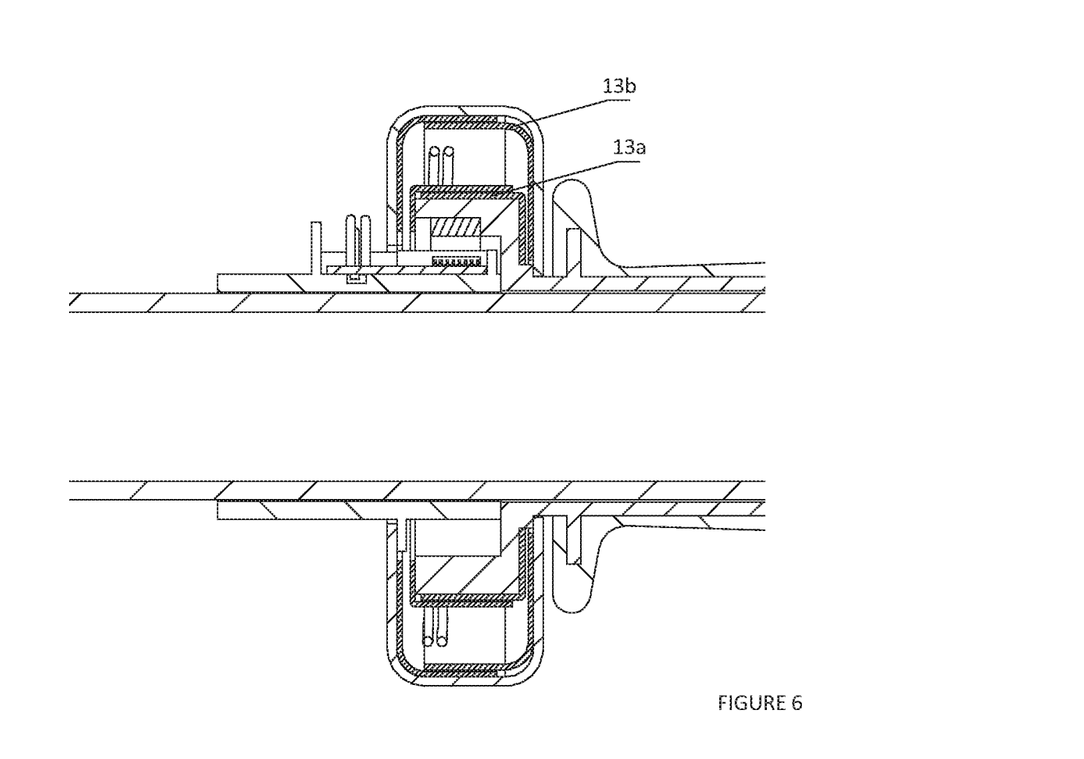
Figure 7:
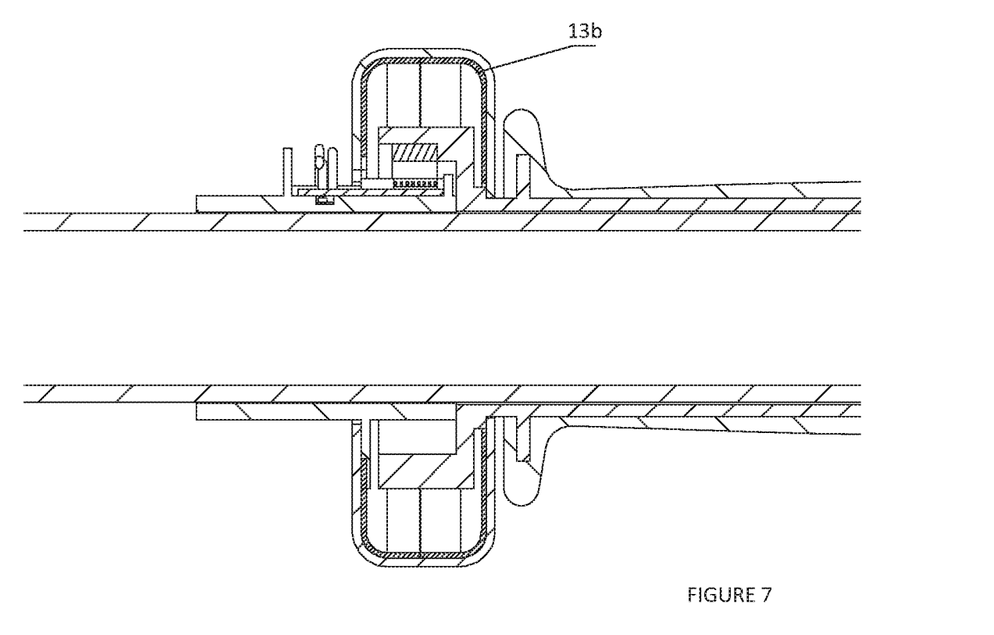

In order to adjust the non-sensitivity of the detection module to the external fields that may apply, shielding can be configured in different ways. FIGS. 2b and 2c give a first approach to shielding, FIGS. 5, 6 and 7 give further examples. In FIG. 5, the second shielding 13b is only positioned, axially, in the part upstream of the detection module towards the handle. In FIG. 6, the first and second shieldings 13a, 13b overlap radially at the axial level where the probe 9 and magnet 8 are positioned. In FIG. 7, the only second shielding 13b is the shielding element.

Figure 8A:
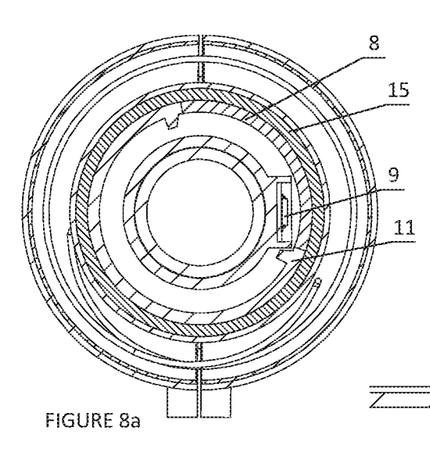
FIGS. 8a, 8b, 9a, 9b, 9b show cross-sectional and longitudinal views of alternative embodiments with a magnetic cylinder head.
Figure 8B:
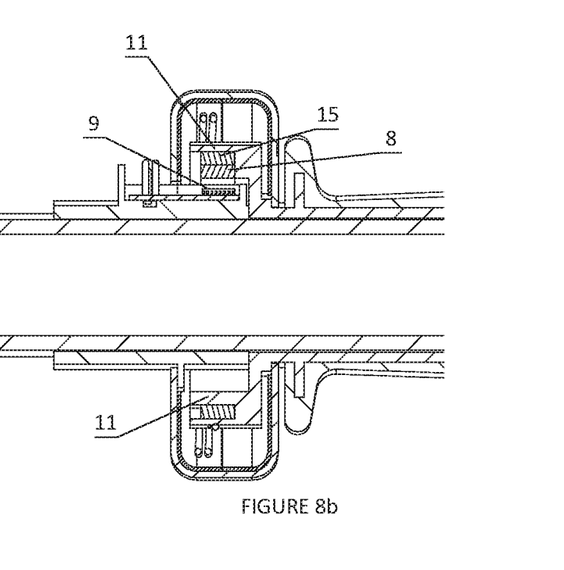
Figure 9A:
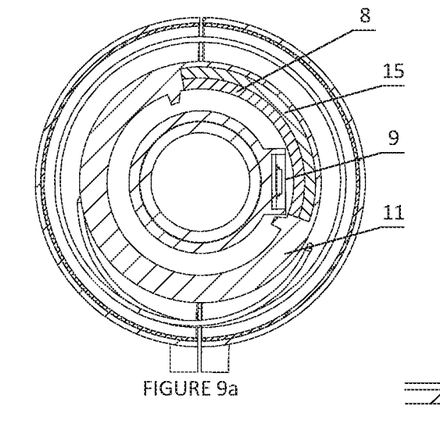
Figure 9B:
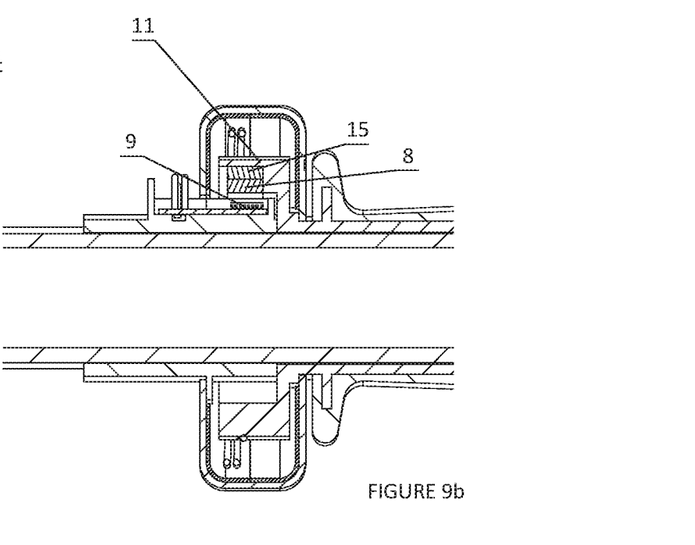

In combination with the shielding 13a, 13b described above, it may be considered to integrate a ferromagnetic cylinder head 15 behind and supporting the magnet 8. For example, this cylinder head 15 can be used as a support for the magnet 8 in addition to the magnet holder 11 previously described, and as shown in FIGS. 8a and 8b. In this case, the cylinder head completely surrounds the tube 3, with the magnet holder 11 integrating this cylinder head 15. This cylinder head 15 can also have an angular width equal to that of the magnet 8 as shown in FIGS. 9a and 9b or slightly larger than that of the magnet 8. This cylinder head 15 has two benefits: it increases the magnetic induction flux detected at the probe 9 and participates in shielding the magnetic flux that may come from an external disturbance.

Figures 10A, 10B:
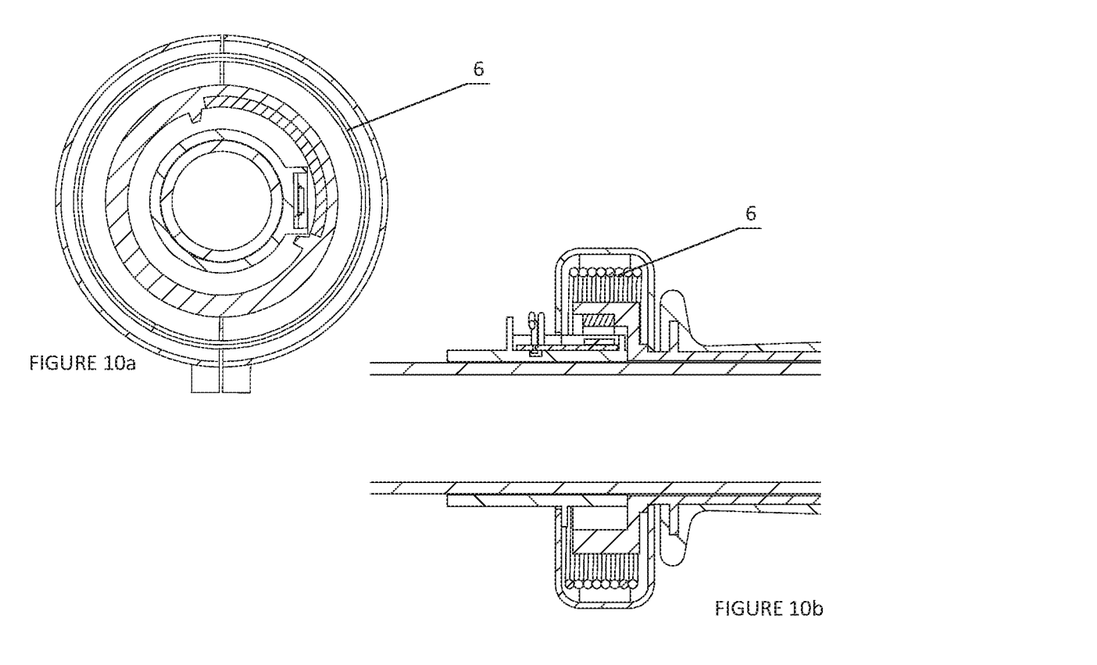
FIGS. 10a and 10b show cross-sectional and longitudinal views of one particular embodiment of shielding using the mechanical spring, respectively.

FIGS. 10a and 10b show a particular embodiment where the additional shielding is absent but the mechanical spring 6 has a full spiral configuration and is extended axially along the detection module. By choosing a ferromagnetic material for the construction of this spring 6, it is thus possible to benefit from an effective magnetic shielding against possible external magnetic fields and from an elastic return element that brings the handle back to its initial position.

Figures 11A, 11B:
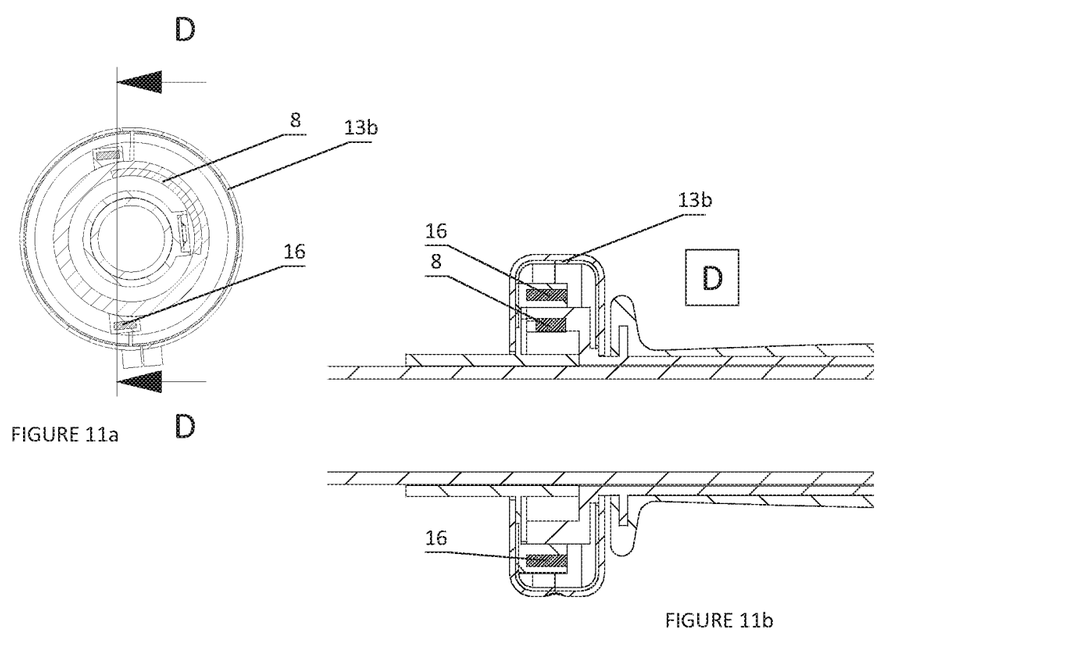
FIGS. 11a and 11b show cross-sectional and longitudinal views (D) respectively of an alternative embodiment with a magnetic spring effect.

As an alternative to the use of a mechanical spring 6 previously presented, it is also possible to consider an alternative embodiment integrating in place of this mechanical spring 6 a spring effect by a magnetic action between the magnet 8 and a return magnet 16, located radially outside the magnet 8 as shown in FIGS. 11a and 11b. In this case, using the second shielding 13b is preferred, always in order to allow protection against possible external magnetic fields. The magnetization of the return magnet 16 can vary in its orientation and amplitude depending on the desired return force but also on the influence on the probe 9.

Figures 12A, 12B:
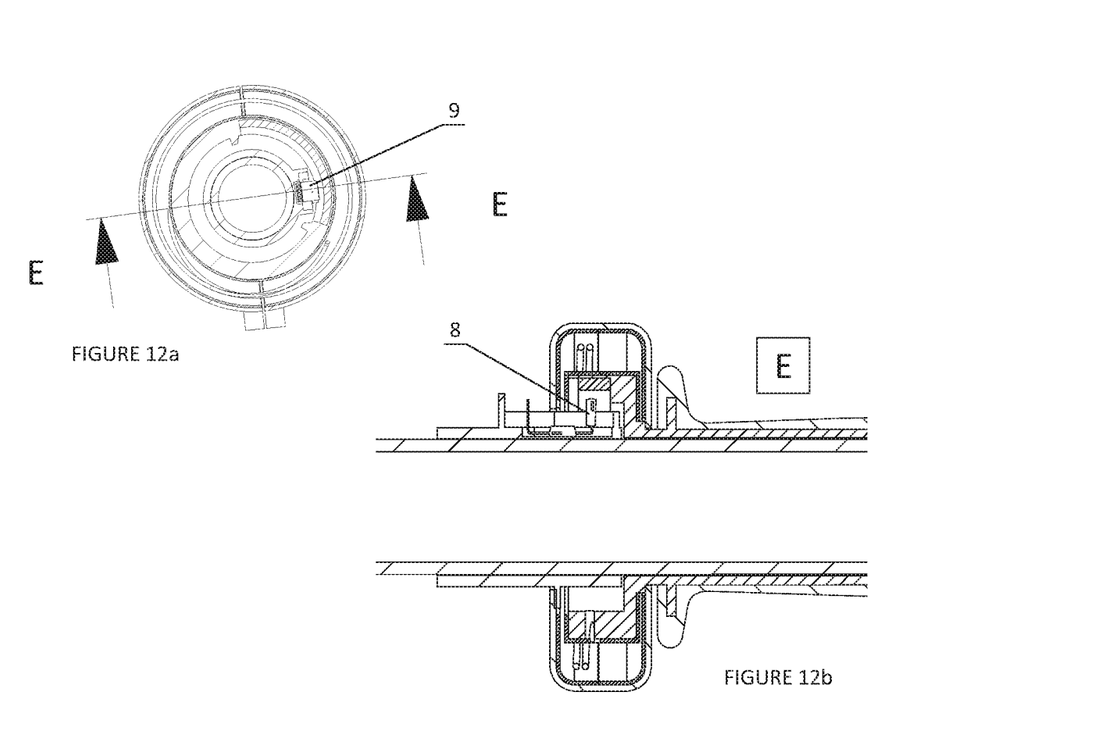
FIGS. 12a and 12b show cross-sectional and longitudinal views (E) respectively of an alternative embodiment wherein the detection probe has a different orientation from the previous cases.
Figures 13A, 13B:
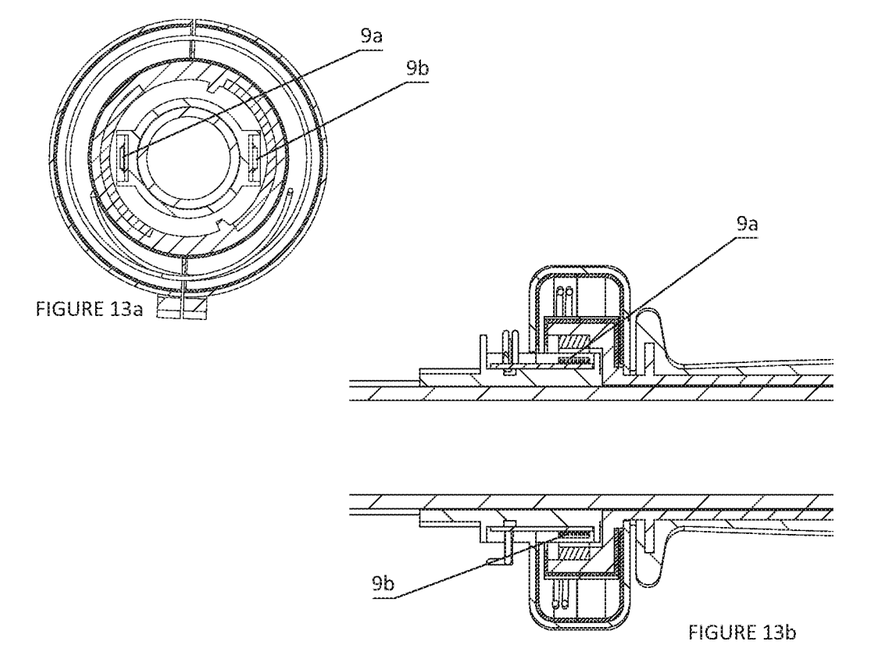
FIGS. 13a and 13b show cross-sectional and longitudinal views of an alternative embodiment with two detection probes respectively.

FIGS. 12a and 12b simply illustrate the case, given as an example, where the probe 9 has a different orientation from that shown above. Indeed, in this example, the probe 9 is so oriented that its largest surface is perpendicular to the axis of the handle 2. As well as orientation, the number of probes 9 used may vary and in particular, as shown in FIGS. 13a and 13b, two probes 9a and 9b may be used to provide, for example, signal redundancy in the event of failure of one or the other of the probes 9a, 9b. In the case of the example shown, the two probes 9a, 9b are positioned at 180° to each other without this angle being restrictive, each probe is opposite a magnet tile. The magnet can then even be made up of a single ring to simplify manufacturing.

Figures 14A, 14B:
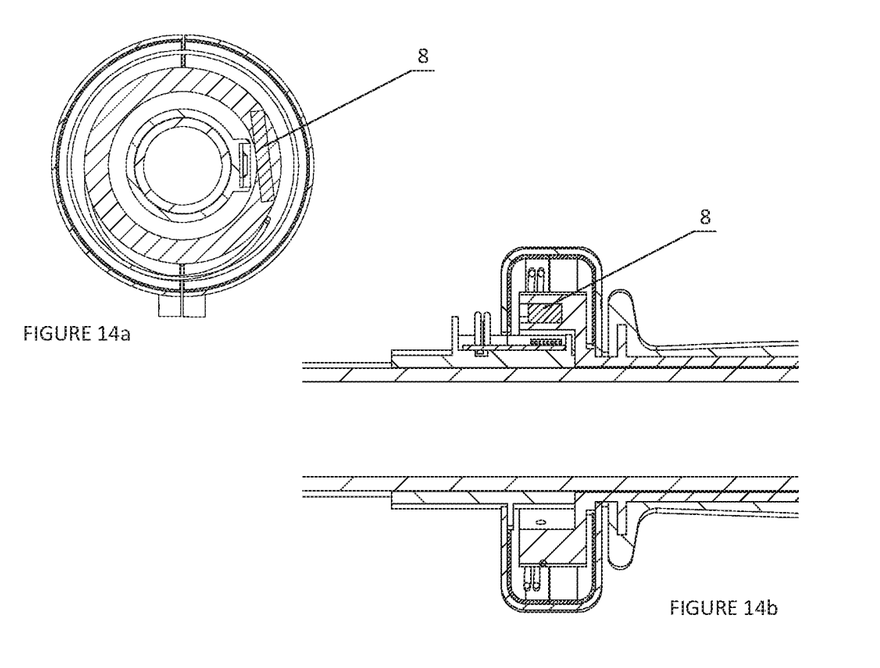
FIGS. 14a and 14b show cross-sectional and longitudinal views respectively of an alternative embodiment wherein the magnet is parallelepiped in shape.

Finally, in the example of FIGS. 14a and 14b, using a parallelepiped-shaped magnet 8 can be considered without leaving the scope of the invention. The shape of the magnet is therefore not critical but its angular width and magnetization direction are significant and must comply with the above description with an evolving and rotating magnetization direction. The overall shape of the magnet is defined as cylindrical, i.e. a regulated surface the generators of which are parallel to each other and here parallel to the handlebar axis.

Figure 16:
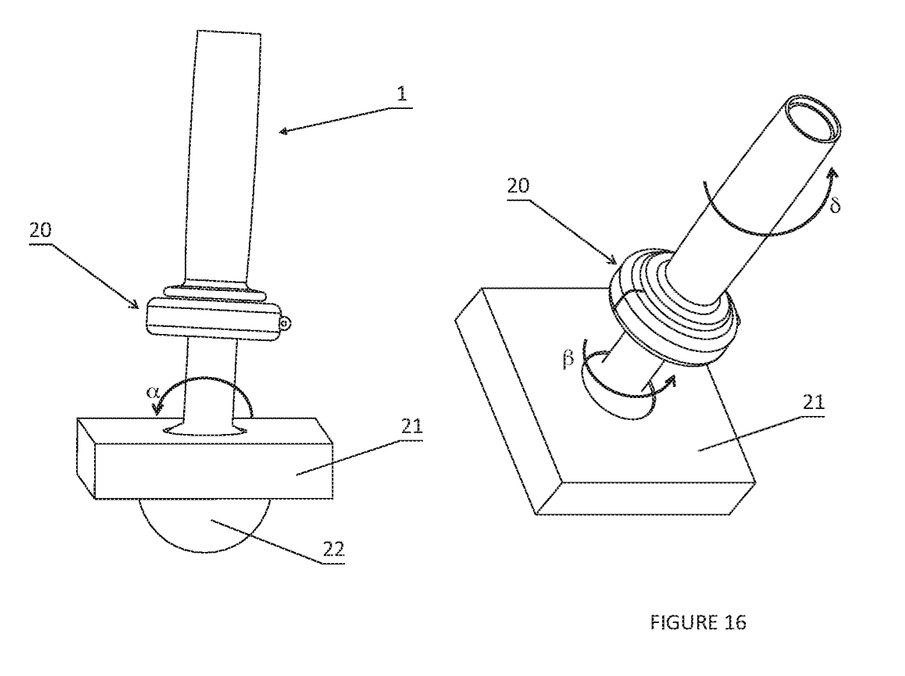
FIG. 16 shows two perspective views of a diagram of the use of a module according to the invention for a control joystick.

FIG. 16 shows that the detection module 20 according to the invention can also be integrated in a joystick to control the relative rotation (δ) of a handlebar 1 with respect to a mechanical ball joint 22 which also allows rotational movement at several angles, for example (α, β), relative to the joystick reception platform 21. The latter may be destined for a passenger vehicle, material handling vehicle, or recreational vehicle, to name but a few examples.

In all the figures and example cases described above, it is obvious that each variant can be combined with another one, particularly as regards shielding, number of probes, size and shape of the magnet, without leaving the scope of this invention.

The invention claimed is:

1. A module for detecting an angular position of a rotating handle configured for attachment on a tube of a handlebar of a vehicle next to said rotating handle, said module comprising:
   a cylindrical magnet;
   a probe detecting a magnetic field produced by said magnet;
   a support supporting said probe;
   a printed circuit board whereon said probe is secured;
   a support supporting said magnet and a flange housing said module;
   said probe being a magneto-sensitive probe detecting rotation of said magnetic field emitted by said magnet and being secured to said handlebar;
   a magnet holder and said magnet being secured to said rotating handle;
   said magnet holder and said magnet forming a cavity so that an inner radial surface of said magnet is positioned outside and opposite said magneto-sensitive probe; and
   said magnet including a continuously variable magnetization direction so that mechanical rotation of said handle of less than 120° leads to a total rotation of an angle of said magnetic field, generated by said magnet at a measurement point, greater than 180°.

2. The module for detecting said angular position of said rotating handle according to claim 1, wherein said magnet has an angular width, considered from a center of said handlebar, substantially equal to an angular travel of said rotating handle.

3. The module for detecting said angular position of said rotating handle according to claim 1, wherein said magnet has an angular width, considered from a center of said handlebar, substantially equal to 360°.

4. The module for detecting said angular position of said rotating handle according to claim 1, wherein said rotation of said angle of said magnetic field is substantially equal to 3 times said complete mechanical rotation of said rotating handle.

5. The module for detecting said angular position of said rotating handle according to claim 1, wherein said mechanical rotation of said rotating handle of less than 90° leads to said total rotation of said angle of said magnetic field, generated by said magnet at said measuring point, greater than 180°.

6. A module for detecting an angular position, said module comprising:
   a rotating handle attached on a tube of a handlebar of a motor vehicle next to said rotating handle;
   a cylindrical magnet;
   a probe operably detecting a magnetic field produced by said magnet;
   a support for said probe;
   a printed circuit whereon said probe is secured;
   a support for said magnet;
   a flange used as a housing for said module;
   said probe operably detecting rotation of said magnetic field emitted by said magnet and being carried by said printed circuit secured to said handlebar;
   a magnet holder and said magnet including a cavity so that an inner radial surface of said magnet is positioned outside and opposite said magneto-sensitive probe;

said magnet having an angular width, considered from a center of said handlebar, substantially equal to an angular travel of said rotating handle; and an elastic return spring positioned radially and externally to said magnet support.

7. The module for detecting said angular position of said rotating handle according to claim 6, wherein said spring is made of a magnetic material.

8. The module for detecting said angular position of said rotating handle according to claim 6, wherein said spring is produced by magnetic cooperation of a return magnet with said magnet.

9. The module for detecting said angular position of said handle rotating according to claim 6, wherein said magnet holder supports a magnetic shield on its periphery.

10. The module for detecting said angular position of said rotating handle according to claim 6, further comprising a magnetic shielding positioned inside said housing and secured to said housing.

11. The module for detecting said angular position of said rotating handle according to claim 10, wherein said shielding has an angular width substantially equal to that of said magnet.

12. The module for detecting said angular position of said rotating handle according to claim 10, wherein said shielding has an angular width substantially equal to 360°.

13. The module for detecting said angular position of said rotating handle according to claim 6, wherein said flange is made of a magnetic material.

14. A handle for an upright on a tube of a handlebar of a vehicle, said handle comprising:

a permanent magnet secured to a first part of said handle;

a magneto-sensitive sensor probe secured to a second part of said handle, with said parts being movable in rotation with respect to each other;

said permanent magnet has a semi-cylindrical shape;

a detection module comprising a printed circuit board whereon said probe is secured;

a support of said permanent magnet and a flange being used as a housing for said module;

said magneto-sensitive probe detecting rotation of a magnetic field emitted by said permanent magnet and being secured to said handlebar, with said magnet holder and said permanent magnet being secured to said handle;

said magnet holder and said permanent magnet forming a cavity with an inner radial surface of said permanent magnet being positioned outside and opposite said magneto-sensitive probe; and said permanent magnet having a continuously variable magnetization direction so that a total rotation of an angle of said magnetic field, generated by said permanent magnet at a measurement point during mechanical rotation of said handle, is greater than 180°.

\* \* \* \* \*